United States Patent
Sadat et al.

(10) Patent No.: US 11,402,839 B2
(45) Date of Patent: Aug. 2, 2022

(54) ACTION PLANNING SYSTEM AND METHOD FOR AUTONOMOUS VEHICLES

(71) Applicant: Robert Bosch GmbH, Stuttgart (DE)

(72) Inventors: Seyed Abbas Sadat, Sunnyvale, CA (US); Thomas Glaser, Sunnyvale, CA (US); Jason Scott Hardy, Union City, CA (US); Mithun Jacob, Santa Clara, CA (US); Joerg Mueller, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 16/469,435

(22) PCT Filed: Mar. 7, 2018

(86) PCT No.: PCT/EP2018/055536
§ 371 (c)(1),
(2) Date: Jun. 13, 2019

(87) PCT Pub. No.: WO2018/162521
PCT Pub. Date: Sep. 13, 2018

(65) Prior Publication Data
US 2020/0097008 A1 Mar. 26, 2020

Related U.S. Application Data

(60) Provisional application No. 62/468,140, filed on Mar. 7, 2017.

(51) Int. Cl.
*G05D 1/02* (2020.01)
*G05D 1/00* (2006.01)
*G08G 1/01* (2006.01)

(52) U.S. Cl.
CPC ......... *G05D 1/0212* (2013.01); *G05D 1/0027* (2013.01); *G05D 1/0088* (2013.01); *G08G 1/0125* (2013.01); *G05D 2201/0213* (2013.01)

(58) Field of Classification Search
CPC .......................... G05D 1/0027; G05D 1/0212
See application file for complete search history.

(56) References Cited

U.S. PATENT DOCUMENTS 6,176,837 B1 * 1/2001 Foxlin ..................... G01S 15/87
600/595
8,437,890 B2 * 5/2013 Anderson .............. G08G 1/166
701/3

(Continued)

FOREIGN PATENT DOCUMENTS

EP  1 898 232 A1  3/2008
EP  2 495 713 A1  9/2012

(Continued)

OTHER PUBLICATIONS

English Translation of Japanese Office Action corresponding to Japanese Patent Application No. 2019-548707, dated Nov. 24, 2020 (4 pages).

(Continued)

*Primary Examiner* — Jess Whittington
(74) *Attorney, Agent, or Firm* — Maginot, Moore & Beck LLP

(57) ABSTRACT

An action planning system (100) and method for autonomous vehicles are provided. The system (100) comprises one or more processors (108) and one or more non-transitory computer-readable storage medium (110) having stored thereon a computer program used by the one or more processors (108), wherein the computer program causes the one or more processors (108) to estimate future environment of an autonomous vehicle (114), generate a possible trajectory for the autonomous vehicle (114), predict motion and reactions of each dynamic obstacle in the future environment of the autonomous vehicle (114) based on current local traffic context, and generate a prediction iteratively over timesteps.

2 Claims, 8 Drawing Sheets

(56) References Cited

U.S. PATENT DOCUMENTS

| | | | |
|---|---|---|---|
| 2008/0303696 A1* | 12/2008 | Aso | G08G 1/161 |
| | | | 340/933 |
| 2011/0190972 A1* | 8/2011 | Timmons | G01C 21/34 |
| | | | 701/31.4 |
| 2018/0061237 A1* | 3/2018 | Erickson | G08G 1/0112 |

FOREIGN PATENT DOCUMENTS

| | | |
|---|---|---|
| JP | 2008-129804 A | 6/2008 |
| JP | 2008-305014 A | 12/2008 |
| JP | 2016-017914 A | 2/2016 |

OTHER PUBLICATIONS

International Search Report corresponding to PCT Application No. PCT/EP2018/055536, dated Jun. 21, 2018 (5 pages).

* cited by examiner

ACTION PLANNING SYSTEM AND METHOD FOR AUTONOMOUS VEHICLES

CROSS REFERENCE TO RELATED APPLICATIONS

This application is a 35 U.S.C. § 371 National Stage Application of PCT/EP2018/055536 filed on Mar. 7, 2018, which claims the benefit of U.S. Provisional Application No. 62/468,140, filed on Mar. 7, 2017, the disclosures of which are herein incorporated by reference in their entirety.

FIELD

This disclosure relates generally to autonomous vehicles and, more particularly, to action planning systems and methods for autonomous vehicles.

BACKGROUND

Unless otherwise indicated herein, the materials described in this section are not prior art to the claims in this application and are not admitted to the prior art by inclusion in this section.

Conventional action planning device is based on a finite state machine (FSM) approach where the autonomous vehicle decides to make specific actions based on heuristic transition conditions. This FSM approach, however, only allows the autonomous vehicle to passively react to changes in its environment and provides no future look ahead for how the given action might affect how the future traffic situation evolves. FIGS. 1 and 2 illustrate various possible actions such as "follow lane" action with a target or "lane change" action between two target vehicles on an adjacent lane that are evaluated by the prior art action planning devices using the FSM approach.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related a non-transitory computer-readable storage medium having stored thereon a computer program for evaluating reactions and interactions with one or more vehicles, the computer program comprising a routine of set instructions for causing the machine to perform searching through a tree of possible action sequence combinations for an ego vehicle and capturing reactions and interactions with one or more vehicles.

Another aspect of the disclosed embodiment is a method by one or more processors includes estimating future environment of an autonomous vehicle, generating a possible trajectory for the autonomous vehicles, predicting motion and reactions of each dynamic obstacle in the future environment of the autonomous vehicle based on current local traffic context, and generating a prediction iteratively over timesteps. The method further decoupling, by the one or more processors, an action decision time resolution from an iterative prediction resolution.

Another aspect of the disclosed embodiment is a system for an autonomous vehicle includes one or more processors and one or more non-transitory computer-readable storage medium having stored thereon a computer program used by the one or more processors, wherein the computer program causes the one or more processors to estimate future environment of an autonomous vehicle, generate a possible trajectory for the autonomous vehicles, predict motion and reactions of each dynamic obstacle in the future environment of the autonomous vehicle based on current local traffic context, and generate a prediction iteratively over timesteps.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
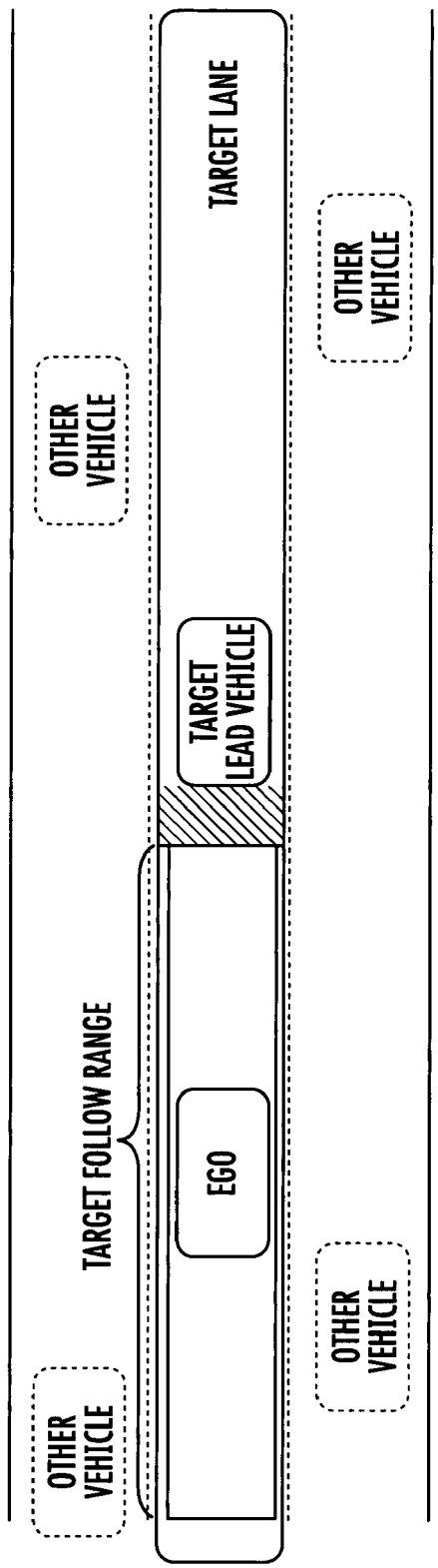
FIG. 1 is a simplified diagram showing a possible follow-lane action using a prior art FSM implemented action planning device for an autonomous vehicle.
Figure 2:
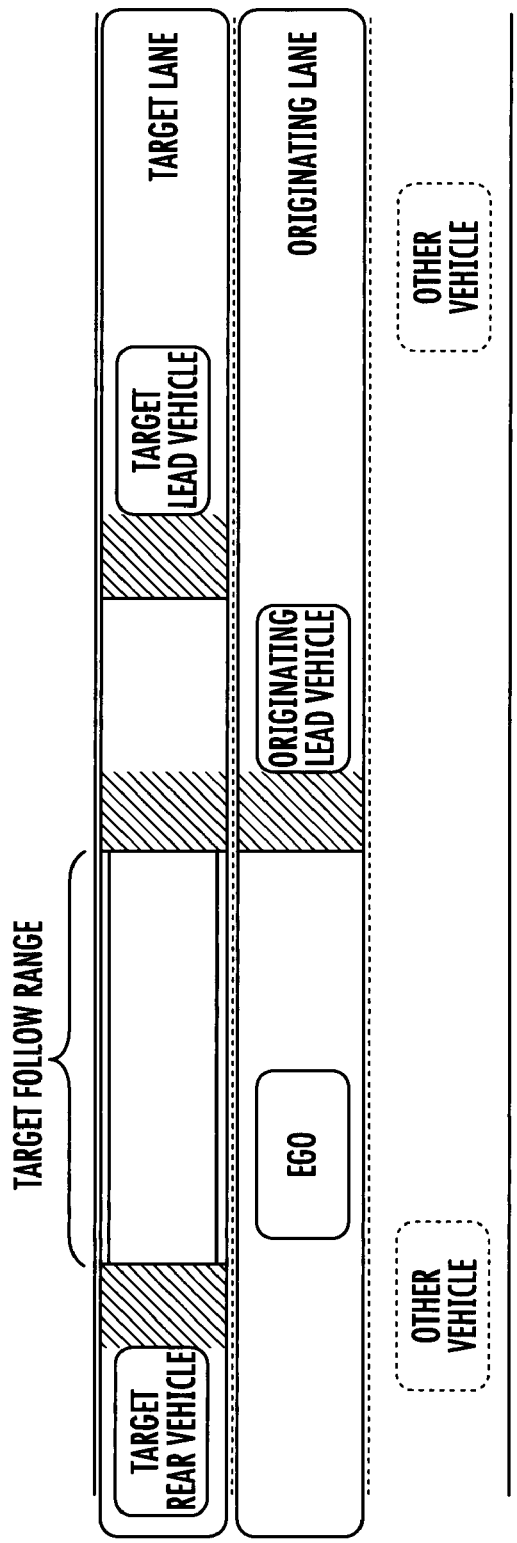
FIG. 2 is a simplified diagram showing a possible lane-change action using the prior art FCM implemented action planning device for an autonomous vehicle.
Figure 3A:
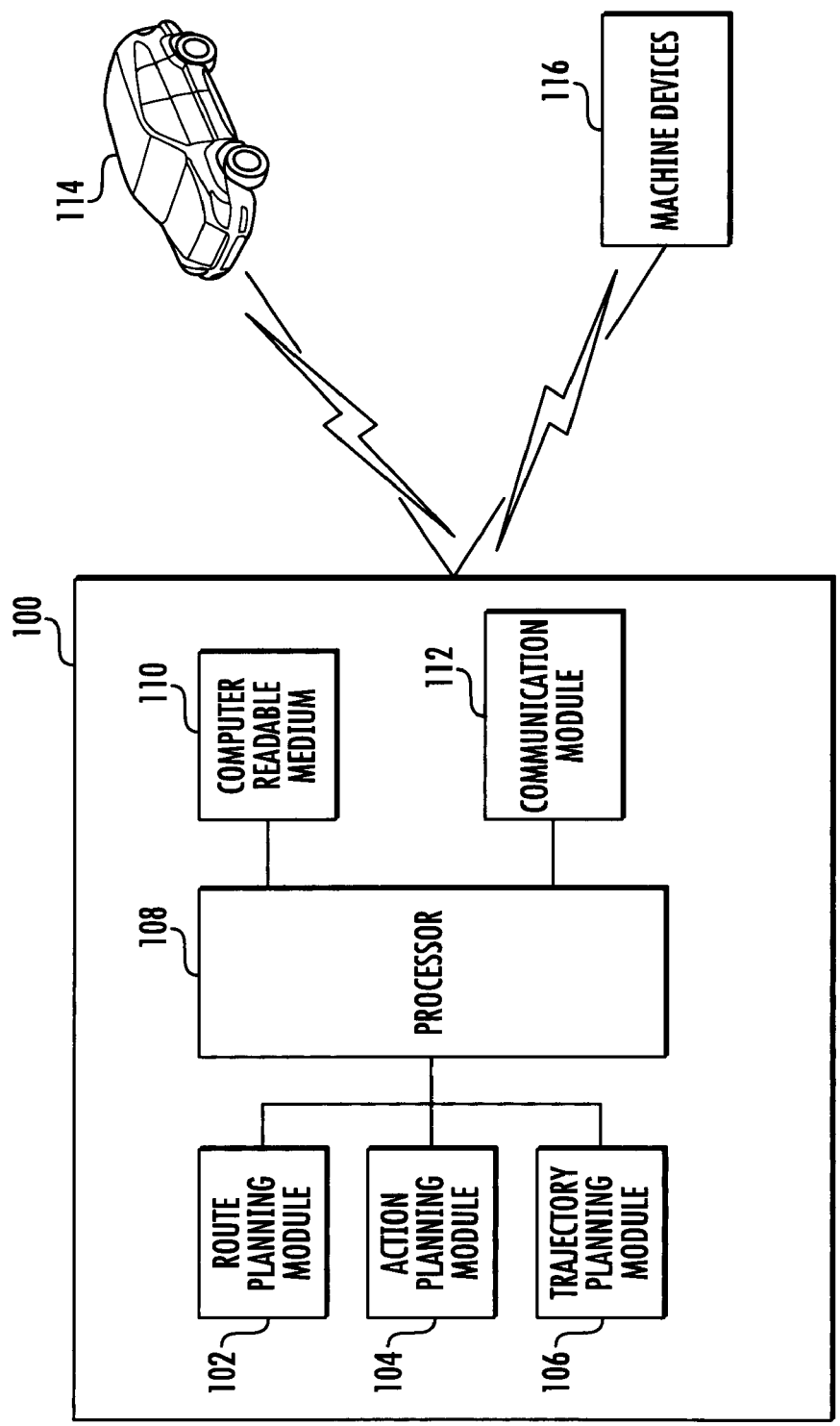
FIG. 3A is an illustration showing an automated driving system according to an embodiment of the disclosure.
Figure 3B:
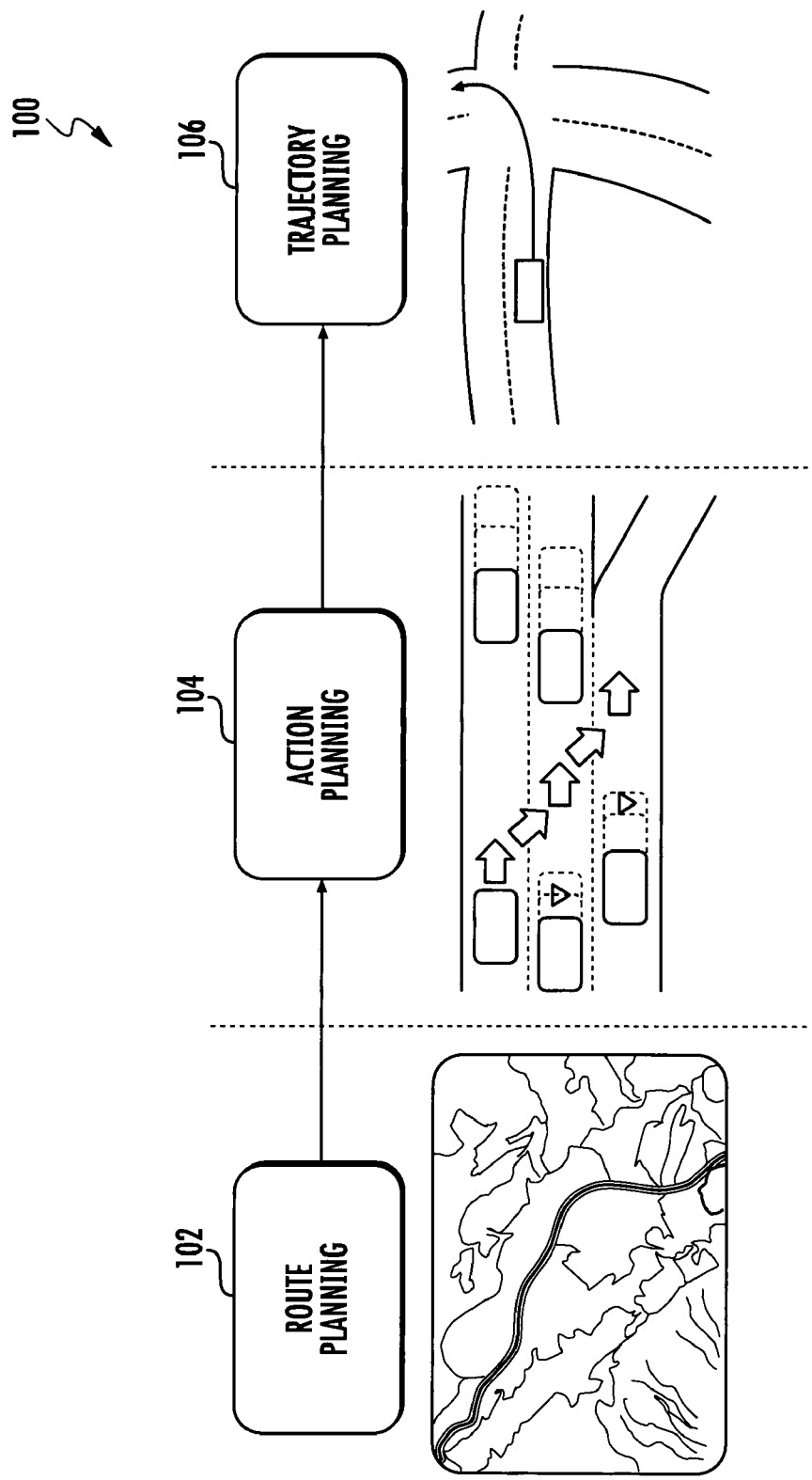
FIG. 3B is a simplified diagram showing a bird eye view of a map and a multilane road including a plurality of neighboring vehicles in proximity to an autonomous vehicle according to a described embodiment of the disclosure.

FIGS. 3A and 3B illustrate an automated driving system 100 in accordance with one aspect of the disclosure. As depicted in FIG. 3A, the driving system 100 may be either integrated into a vehicle 114, a machine device, or any suitable portable or mobile device/vessel. While certain aspects of the disclosure are particularly useful in connection with specific types of vehicles, the vehicle may be any type of vehicles including, but not limited to, cars, trucks, motorcycles, buses, boats, sport-utility vehicles, two-wheelers, airplanes, helicopters, lawnmowers, recreational vehicles, amusement park vehicles, trams, golf carts, trains, trolleys, ultralights, and the like. The vehicle may have one or more automated driving systems. The machine devices may be any type of devices including, but not limited to, cellular phones, laptops, tablets, wearable devices such as watches, glasses, goggles, or any suitable portable devices. As depicted in FIG. 3A, the automated driving system 100 includes a processor 108, a computer readable medium 110, and a communication module 112. A route planning module 102, an action planning module 104, and a trajectory planning module 106 may be provided in the automated driving system 100.

Although the route planning module 102, the action planning module 104, the trajectory planning module 106, the processor 108, the computer readable medium 110, and the communication module 112 as being within the same block 100, it will be understood by those of ordinary skill in the art that the route planning module 102, the action planning module 104, the trajectory planning module 106, the processor 108, the computer readable medium 110, and the communication module 112 may or may not be housed in the same block 100. In various of the aspects described herein, the processor 108, the computer readable medium 110, and the communication module 112 may be integrated into a computer located outside the automated driving system 100. In other aspects, some of the processes described herein are executed on a processor disposed within the vehicle 114 and others by a remote processor disposed within the machine device 116.

The computer readable medium 110 stores information accessible by the route planning module 102, the action planning module 104, the trajectory planning module 106, and the processor 108 including computer-executable instructions that may be executed or otherwise used by route planning module 102, the action planning module 104, the trajectory planning module 106, and the processor 108. The processor 108 may be any conventional processor. Alternatively, the processor 108 may be a dedicated device such as an ASIC.

The communication module 112 in wired/wireless communication with other computers such as one or more electronic controller units, one or more processors, networks, directly or indirectly. Other sensing devices such as sensors, user interface such as a touch display, mouse, keyboard, audio input, camera, and other suitable computer implemented modules may be integrated into or communicatively coupled to the system 100.

Processes of route, action, and trajectory running on the route planning module 102, the action planning module 104, and the trajectory planning module 106 generate candidate route, action, and trajectory that an ego vehicle may follow through an environment during a configurable time horizon T. In some aspects, processes of route, action, and trajectory to generate candidate route, action, and trajectory may be run on the processor 108 whereby the route planning module 102, the action planning module 104, and the trajectory planning module 106 are computer-executable instructions being programmed on the processor 108.

As depicted in FIG. 3B, the action planning module 104 is operable to perform a limited horizon search through a tree of possible action sequence combinations for the autonomous vehicle and to combine the horizon search with iterative, full-environment prediction to capture reactions and interactions with other traffic participants. For example, the action planning module 104 performs an optimal graph search to efficiently explore the tree of possible ego actions up to a limited time horizon or a planning horizon. The time horizon includes a start point of time and an end point of time at which the time horizon can be evaluated. The time horizon is necessary to constrain the size of the search space and enable efficient re-planning.

In order to ensure the end point of time is quickly reached, whereby the most suitable path can be found without having to traverse all possible paths or connections, a graphic search technique is used. The graph search technique may be a horizon search technique. However, other suitable graph search techniques may be used. A precomputed static cost is used to estimate a utility cost for a given ego position at the end of the planning time horizon. In one embodiment, the trajectory planning module 106 includes the graph search technique that the ego vehicle 114 may follow through the environment during the configurable time horizon T. In another embodiment, the graph search technique is stored on the action planning module 104. The generated trajectory is then stored in the computer readable medium 110. Further details on action planning using iterative action search full environment prediction will be described below.

Figure 4A:
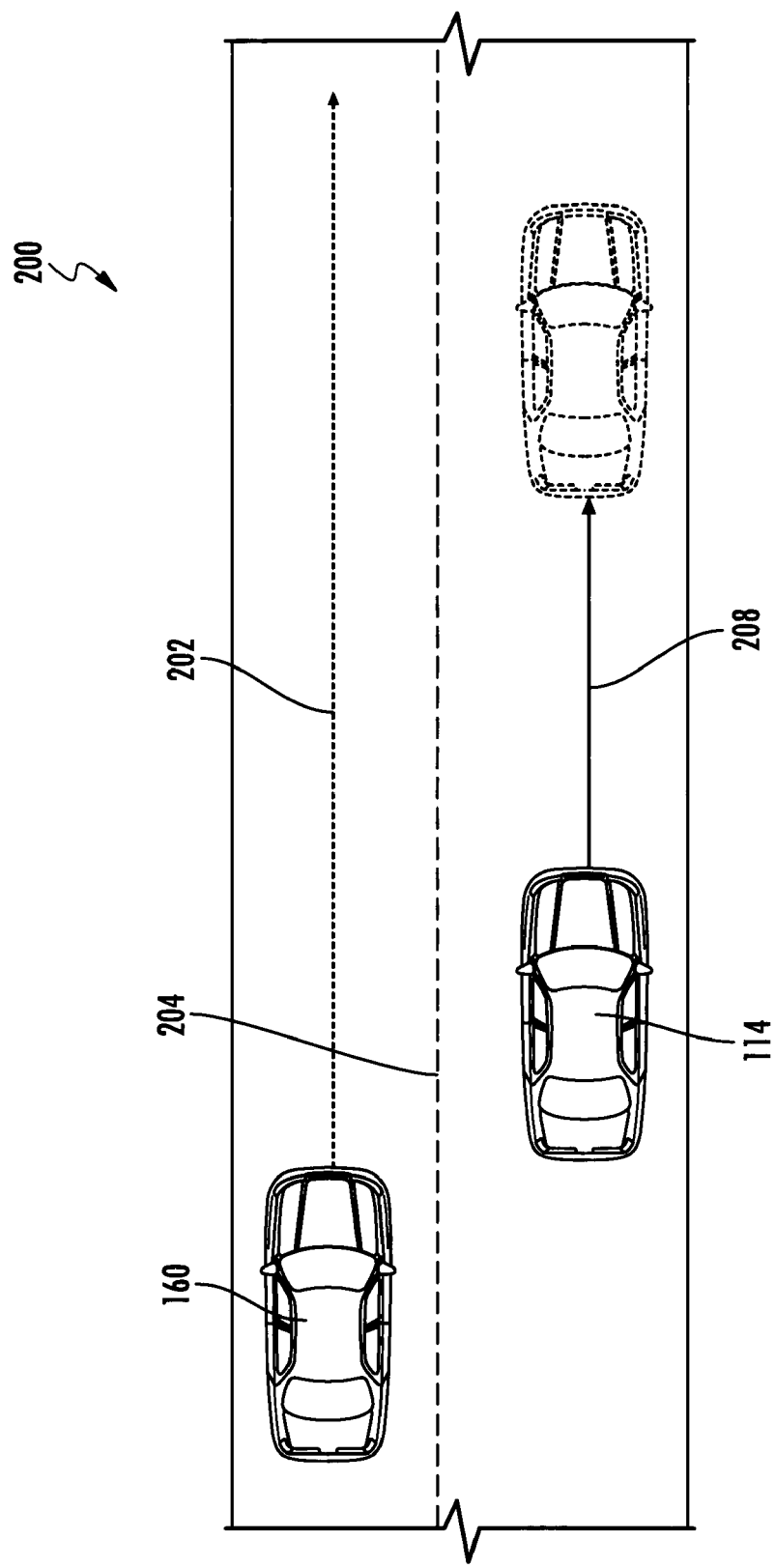
FIGS. 4A-4D are views of the autonomous vehicle traveling autonomously in proximity to a plurality of neighboring vehicles according to a described embodiment of the disclosure.
Figure 4B:
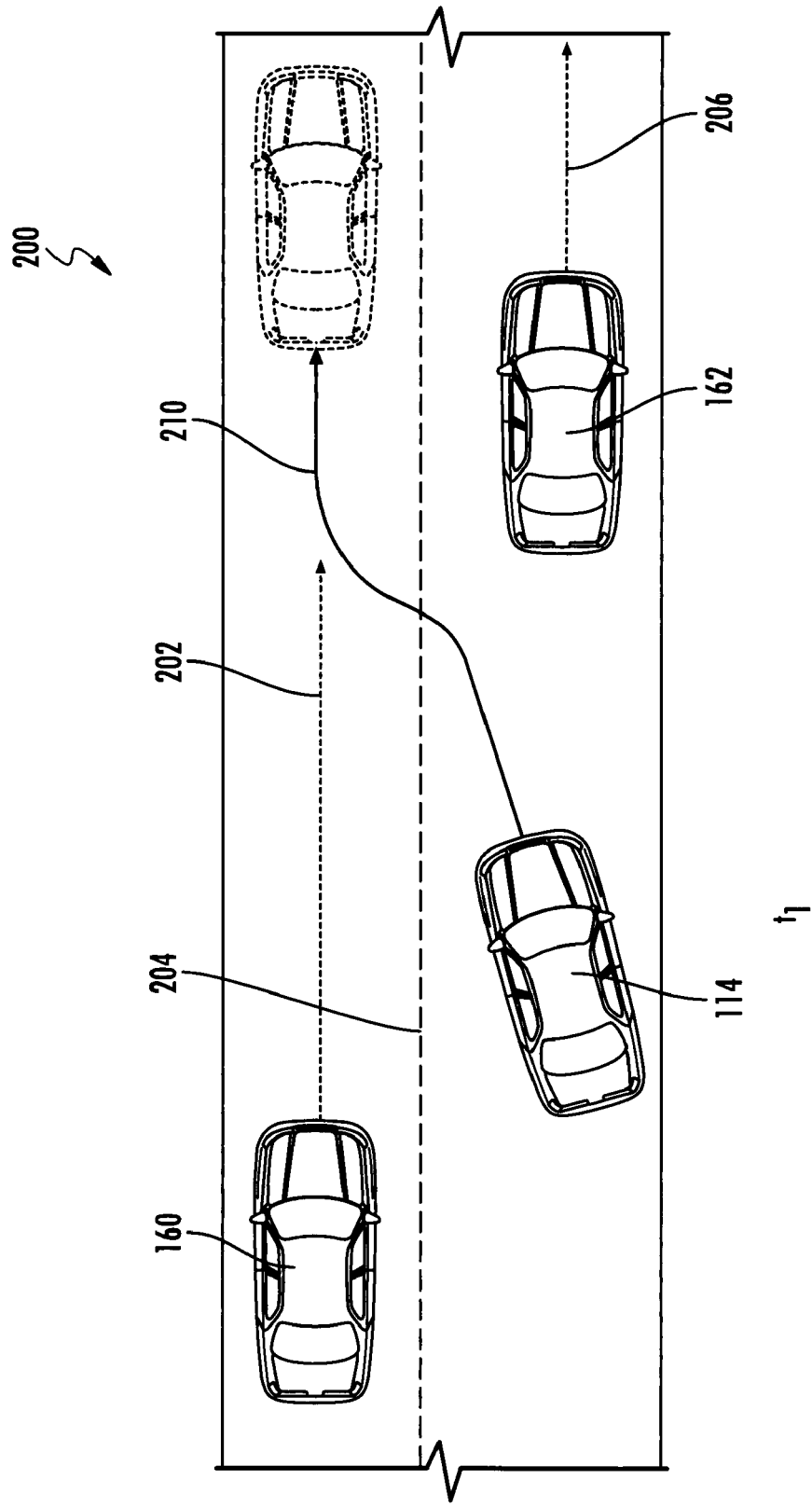

FIGS. 4A-4D are views of the autonomous vehicle 114 on a two-lane road 200 traveling autonomously in proximity to a plurality of neighboring vehicles 160, 162 according to a described embodiment of the disclosure. As depicted in FIG. 4A, the vehicles 160 is currently following the same potential path 202 on the left lane of the two-lane road 200. The autonomous vehicle 114 is currently positioned in the right lane of the two-lane road 200, with the left and right lanes separated by a dividing line 204. The autonomous vehicle 114 or "an ego vehicle" described herein starts in a follow lane action and enumerates all possible actions it can switch to at the next time step. In one aspect, as depicted in FIG. 4A, the ego vehicle 104 continues in the follow lane action and follows the same potential path 208 on the right lane of the two-lane road 200. In another aspect, the autonomous driving system 100 of the ego vehicle 104 may switch from the follow lane action to a lane change action and a planned path 210 for the ego vehicle 104 is depicted in FIG. 4B as crossing over the dividing line 204 to approach the potential path 202 of the neighboring 160 if the lane change action has a lower initial cost. The action planning module 104 having horizon search programmed therein explores switching from the follow lane action to the lane change action. In one embodiment, an iterative full-environment prediction is used which allows the horizon search to evaluate reactions and interactions with other vehicles 160, 102 without explicitly searching over the possible actions of other vehicles 160, 162. The iterative full-environment prediction keeps the horizon search tractable. Each time a new action is evaluated in the horizon graph search, a prediction process is performed that estimates future environment of the ego vehicle 114 at the next timestep assuming the ego vehicle 114 follows the selected action, e.g. a follow lane action, a lane change action, or an abort lane change action. This prediction process includes generating a possible trajectory for the ego vehicle 114 and then predicting the motion and reactions of each dynamic obstacle in the environment of the ego vehicle 114 based on its current local traffic context. The prediction process further includes generating a prediction of how other vehicles may react to their current traffic situation and iteratively over short timesteps. The horizon graph search is able to model interactions between the ego vehicle 114 and other traffic participants without requiring to do any active planning for the other vehicles 160, 162. The iterative passive prediction is much less expensive and scales much better than attempting to perform joint active planning for the ego vehicle 114 and other traffic participants.

Figure 4C:
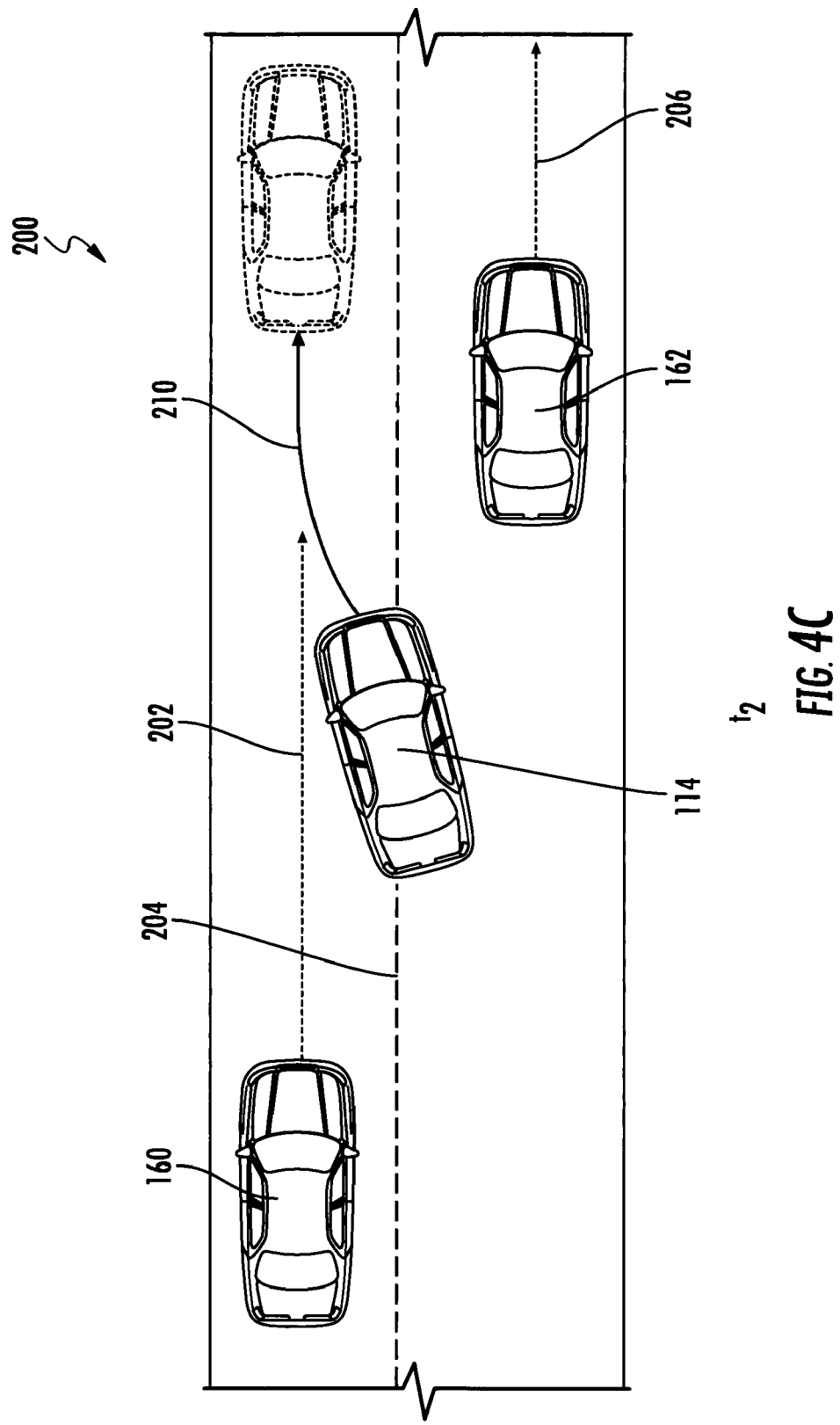
Figure 4D:
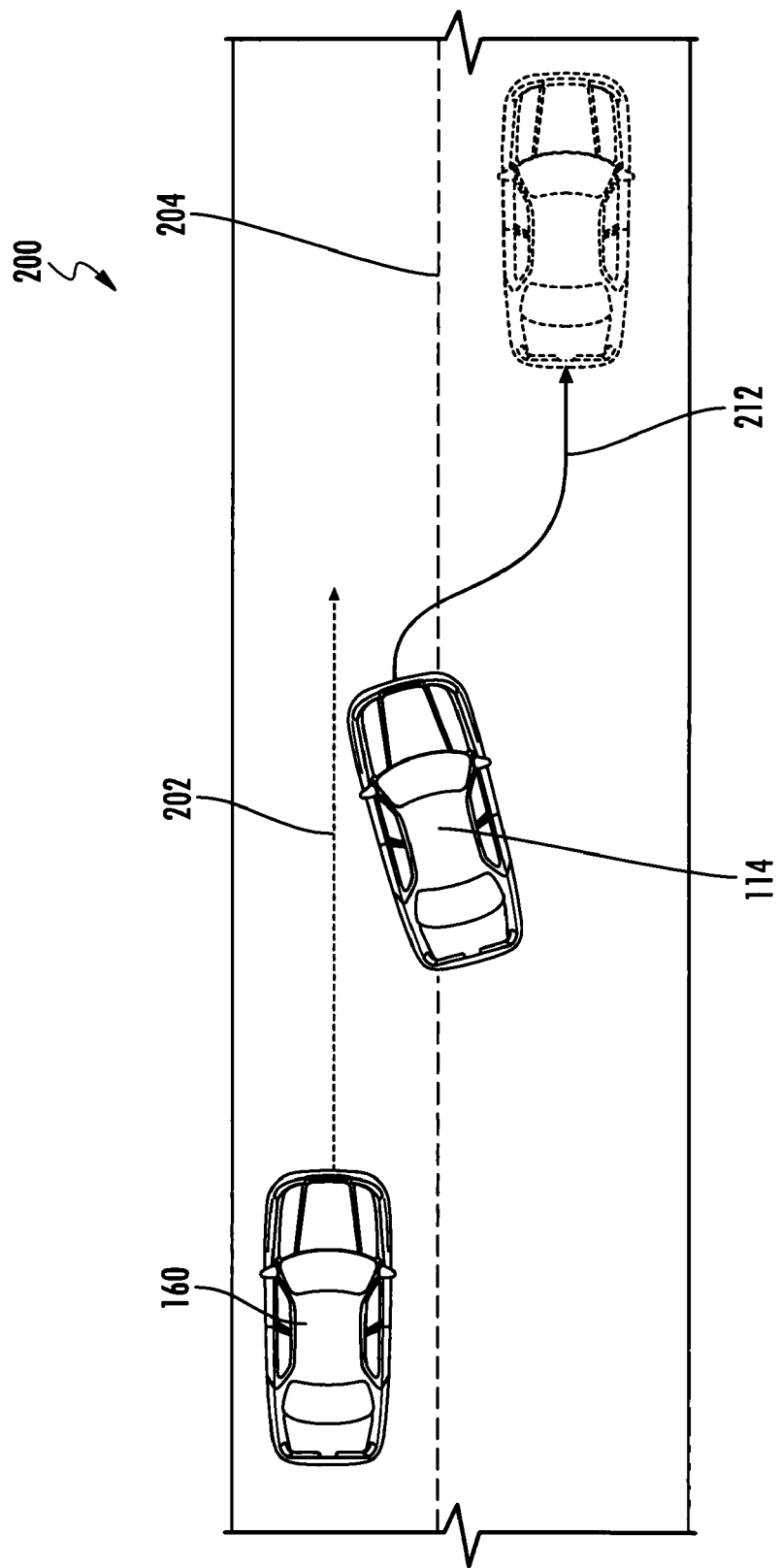

In one aspect, the ego vehicle 104 can either continue in the lane change action or switch from the lane change action to an abort lane change action. As depicted in FIG. 4C, the ego vehicle 104 proceeds to continue in the lane change action by entering the potential path 202 of the neighboring vehicle 160 and the planned path 210 thereby merges to the potential path 202. If either the ego vehicle 104 decides not to switch lanes, or not likely able to change lanes due to on-coming neighboring vehicle 160 approaches the potential path 202, as depicted in FIG. 4D, the autonomous driving system 100 of the ego vehicle 104 switches from the lane change action to the abort lane change action. A planned path 212 for the ego vehicle 104 is shown as crossing over the dividing line 204 to approach the left lane of the two-lane road 200.

Now returning to FIG. 4B, at timestep t1, the ego vehicle 114 generates a lane change trajectory but the other vehicle 160 in the left lane has not yet reacted. At timestep t2, if the ego vehicle either continues with the lane change behavior as illustrated in FIG. 4C or switches to an abort lane change action as shown in FIG. 4D, the ego vehicle trajectory takes the ego vehicle 114 partially into the left lane, causing a reaction for the left-lane vehicle 160. In some embodiments, restricting the action search to only evaluate switching behaviors at a small subset of timesteps, effectively decoupling the iterative prediction time resolution from the action search time resolution. This greatly improves computational efficiency and allows for the evaluation of longer planning horizons, which generates more intelligent action decisions. The limited horizon search though the tree of possible ego actions for intelligent automated driving decision making provides a significant decision making performance improvement. In one example, the ego vehicle 114 explicitly evaluates the expected utility of its actions at future timesteps. In another example, the ego vehicle 114 understands incrementally predicts the actions of other agents based on its own anticipated future state. The ego vehicle 114 explicitly evaluates and compares different possible timings of each action transition to maximize safety, comfort, and progress towards its goal. Iterative prediction allows the action search to understand how other dynamic obstacles react to and interact with the ego vehicle 114 without the need to perform joint anticipatory planning for each dynamic obstacle in the environment. Restricted branch points decouple the action decision time resolution from the iterative prediction resolution, allowing more efficient exploration of longer planning horizons.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
operating an autonomous vehicle with one or more processors to begin a lane change action;
estimating, by the one or more processors, a future environment of the autonomous vehicle based on the lane change action;
generating, by the one or more processors, a possible trajectory for the autonomous vehicle based on the lane change action and the estimated future environment;
predicting, by the one or more processors, motion and reactions of each dynamic obstacle in the future environment of the autonomous vehicle based on current local traffic context and the possible trajectory;
iterating the predicting of the motion and reactions of each dynamic obstacle, with the one or more processors at iterative prediction timesteps;
repeating the estimating of the future environment and the generating of the possible trajectory, with the one or more processors, at action decision timesteps, which are a subset of the iterative prediction timesteps such that the repeating of the estimating of the future environment and the generating of the possible trajectory occurs less frequently than the iterating of the predicting of the motion and reactions of each dynamic obstacle; and
operating the autonomous vehicle with the one or more processors to continue the lane change action or abort the lane change action based on the predictions of the motion and reactions of each dynamic obstacle, the estimates of the future environment, and the generated possible trajectories.

2. An autonomous vehicle comprising:
one or more processors; and one or more non-transitory computer-readable storage media having stored thereon a computer program operated by the one or more processors to:
  operate the autonomous vehicle to begin a lane change action;
  estimate a future environment of the autonomous vehicle based on the lane change action;
  generate a possible trajectory for the autonomous vehicle based on the lane change action and the estimated future environment;
  predict motion and reactions of each dynamic obstacle in the future environment of the autonomous vehicle based on current local traffic context and the possible trajectory;
  iterate the prediction of the motion and reactions of each dynamic vehicle at iterative prediction timesteps;
  repeat the estimating of the future environment and the generating of the possible trajectory at action decision timesteps, which are a subset of the iterative prediction timesteps such that the repeating of the estimating of the future environment and the generating of the possible trajectory occurs less frequently than the iterating of the predicting of the motion and reactions of each dynamic obstacle; and
  operate the autonomous vehicle to continue the lane change action or abort the lane change action based on the predictions of the motion and reactions of each dynamic obstacle, the estimates of the future environment, and the generated possible trajectories.

\* \* \* \* \*